(12) United States Patent
Miyazaki

(10) Patent No.: US 8,605,325 B2
(45) Date of Patent: Dec. 10, 2013

(54) DEVICE, METHOD, AND COMPUTER READABLE MEDIUM FOR INSERTING A USER SELECTED THUMBNAIL INTO AN IMAGE FILE

(75) Inventor: Sadaaki Miyazaki, Aichi (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 1170 days.

(21) Appl. No.: 12/188,748

(22) Filed: Aug. 8, 2008

(65) Prior Publication Data

US 2009/0046323 A1    Feb. 19, 2009

(30) Foreign Application Priority Data

Aug. 15, 2007    (JP) .................................. 2007-211865

(51) Int. Cl.
*G06K 15/02*    (2006.01)
(52) U.S. Cl.
USPC ............. 358/1.2; 358/1.1; 358/403; 358/462; 358/448; 345/670; 345/667; 345/660; 345/619; 715/700; 715/769; 715/822; 715/838

(58) Field of Classification Search
None
See application file for complete search history.

(56) References Cited

U.S. PATENT DOCUMENTS

| | | | |
|---|---|---|---|
| 5,553,277 A * | 9/1996 | Hirano et al. .......................... | 1/1 |
| 6,424,429 B1 | 7/2002 | Takahashi et al. | |
| 6,462,779 B1 * | 10/2002 | Philbrick ....................... | 348/312 |
| 7,257,770 B2 * | 8/2007 | Narahara ....................... | 715/234 |
| 2004/0135815 A1 * | 7/2004 | Browne et al. ................. | 345/810 |
| 2005/0254072 A1 * | 11/2005 | Hirai et al. ...................... | 358/1.2 |
| 2006/0001650 A1 * | 1/2006 | Robbins et al. ................ | 345/173 |
| 2006/0087668 A1 | 4/2006 | Takahashi | |
| 2007/0159658 A1 * | 7/2007 | Kato ............................. | 358/3.21 |
| 2007/0203948 A1 * | 8/2007 | Yoshida et al. ............. | 707/104.1 |

FOREIGN PATENT DOCUMENTS

| | | |
|---|---|---|
| JP | HEI 11-143907 A | 5/1999 |
| JP | 2001-51987 | 2/2001 |
| JP | 2001-339556 | 12/2001 |
| JP | 2002-72991 | 3/2002 |
| JP | 2003-196638 | 7/2003 |
| JP | 2006-74165 | 3/2006 |
| JP | 2006-99163 | 4/2006 |
| JP | 2006-119915 | 5/2006 |
| JP | 2006-285745 | 10/2006 |
| JP | 2007-189428 | 7/2007 |
| JP | 2007-201935 | 8/2007 |

OTHER PUBLICATIONS

Machine translation of Japanese Published App. No. 2003-196638 to Kawazoe, Hiroshi filed on Dec. 26, 2001.*

* cited by examiner

*Primary Examiner* — Paul F Payer
(74) *Attorney, Agent, or Firm* — Scully, Scott, Murphy & Presser, P.C.

(57) ABSTRACT

There is provided an image processing device, comprising: an input unit configured to accept a user instruction to designate first image data; and an image addition unit configured to add the first image data corresponding to the user instruction to second image data, as a thumbnail for the second image data.

19 Claims, 14 Drawing Sheets

REGISTER BY SCANNING

FIG.9A
```
DO YOU REGISTER THUMBNAIL?
1.Yes  2.No
```

FIG.9B
```
DO YOU REDUCE SIZE OF IMAGE DATA TO BE REGISTERED?
1.Yes  2.No
```

FIG.9C
```
DO YOU START SCANNING?
1.Yes  2.No
```

FIG.9D
```
SCANNING ...
```

FIG.9E
```
REGISTRATION OF THUMBNAIL IS RUNNING
```

FIG.9F
```
REGISTER NAME
TELEPHONE
```

FIG.9G
```
END
```

FIG.12A　DO YOU START SCANNING?
1.Yes  2.No

FIG.12B　SCANNING ···

FIG.12C　SELECT THUMBNAIL
1.TELEPHONE

FIG.12D　ADDING DATA TO FILE IS RUNNING

FIG.12E　END

ONSCREEN REPRESENTATION OF LCD

FIG.14A
```
DO YOU START SCANNING?
1.Yes  2.No
```

FIG.14B
```
SCANNING ...
```

FIG.14C
```
DO YOU START SCANNING FOR THUMBNAIL?
1.Yes  2.No
```

FIG.14D
```
SCANNING ...
```

FIG.14E
```
ADDING DATA TO FILE IS RUNNING
```

FIG.14F
```
END
```

DEVICE, METHOD, AND COMPUTER READABLE MEDIUM FOR INSERTING A USER SELECTED THUMBNAIL INTO AN IMAGE FILE

CROSS-REFERENCE TO RELATED APPLICATION

This application claims priority under 35 U.S.C. §119 from Japanese Patent Application No. 2007-211865, filed on Aug. 15, 2007. The entire subject matter of the application is incorporated herein by reference.

BACKGROUND

1. Technical Field

Aspects of the present invention relate to an image processing device for processing images.

2. Related Art

Recently, a filing system which files image data of a number of documents read by a scanner has been proposed. If a creation date and time of an image file is used as a filename of the image file, a user is not able to recognize a body part (i.e., a substantial image) in the image file. Therefore, to select a desired image file from among a plurality of image files stored in a storage device, the user needs to conduct a selection operation while viewing an image of each image file displayed on a screen through a displaying function of the filing system. Such a selection operation is very troublesome for the user.

Japanese Patent Provisional Publication No. HEI 11-143907A discloses a filing system which is able to display thumbnail images of stored document images. Through a screen on which thumbnail images of documents are displayed, a user is able to easily select a desired image file.

SUMMARY

However, if a complicated image or an image having a low contrast is reduced, and the reduced image is displayed or printed as a thumbnail image, the user may not be able to recognize an original image (i.e., the substantial image) from the thumbnail image. That is, there is a possibility that a thumbnail image does not achieve a purpose of enabling a user to easily recognize an original image.

Aspects of the present invention are advantageous in that at least one of a device, a method and a computer readable medium capable of creating a thumbnail image reflecting properly a user's intention is provided.

According to an aspect of the invention, there is provided an image processing device, comprising: an input unit configured to accept a user instruction to designate first image data; and an image addition unit configured to add the first image data corresponding to the user instruction to second image data, as a thumbnail for the second image data.

Such a configuration makes it possible to create a thumbnail image reflecting properly a user' intention.

According to another aspect of the invention, there is provided an image processing method, comprising the steps of: accepting a user instruction to designate first image data; and adding the first image data corresponding to the user instruction to second image data, as a thumbnail for the second image data.

Such a configuration makes it possible to create a thumbnail image reflecting properly a user' intention.

According to another aspect of the invention, there is provided a computer readable medium having computer readable instruction stored thereon, which, when executed by a processor of an image processing device, configures the processor to perform the steps of: accepting a user instruction to designate first image data; and adding the first image data corresponding to the user instruction to second image data, as a thumbnail for the second image data.

Such a configuration makes it possible to create a thumbnail image reflecting properly a user' intention.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMS, flash memory, EEPROMs, CD-media, DVD-media, temporary storage, hard disk drives, floppy drives, permanent storage, and the like.

BRIEF DESCRIPTION OF THE ACCOMPANYING DRAWINGS

FIGS. 9A to 9G illustrate examples of onscreen representation of an operation panel of the MFP during the registration process shown in FIG. 8.

FIGS. 12A to 12E illustrate examples of onscreen representation of the operation panel of the MFP during the image data creation process shown in FIG. 11.

FIGS. 14A to 14F illustrate examples of onscreen representation of the operation panel of the MFP during the image data creation process shown in FIG. 13.

DETAILED DESCRIPTION

Hereafter, embodiments according to the invention will be described with reference to the accompanying drawings.

First Embodiment

Figure 1:
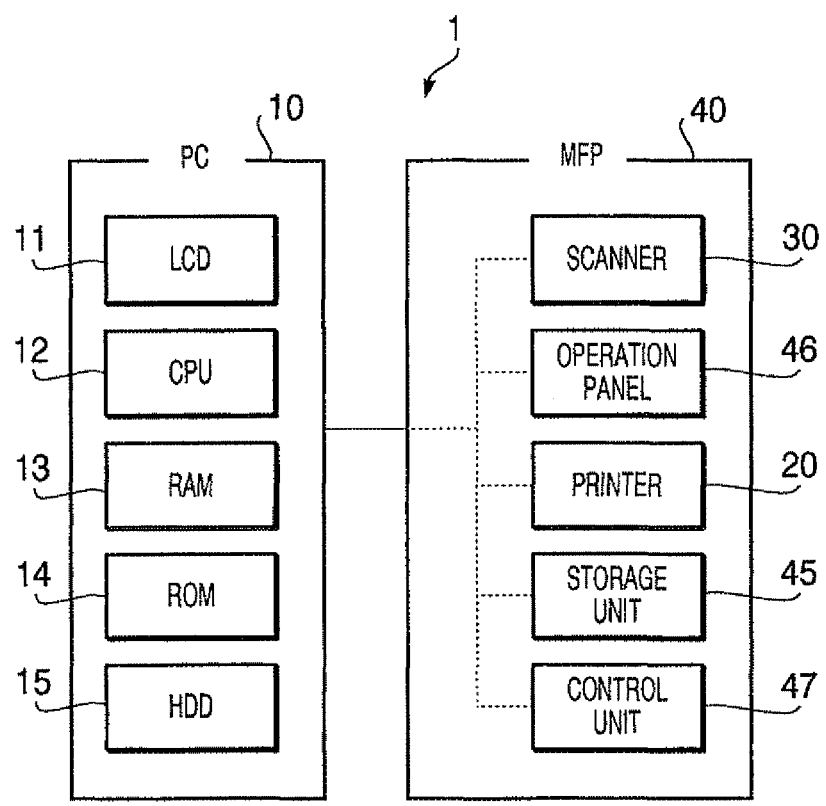
FIG. 1 is a block diagram of an image processing device according to a first embodiment.

FIG. 1 is a block diagram of an image processing device 1 according to a first embodiment. As shown in FIG. 1, the image processing device 1 includes a PC (personal computer) 10 and an MFP (multifunction peripheral) 40 connected via a network. That is, the image processing device 1 is configured as a system including the PC 10 and the MFP 40. The PC 10 includes a CPU 12, a RAM 13, a ROM 14, an HDD 15 and a LCD (liquid crystal display) 11. The MFP 40 includes a printer 20, a scanner 30, a storage device 45, an operation panel 46 and a control unit 47.

The printer 20 has a function of forming an image on a recording medium. The scanner 20 has a function of reading an image from a document. In the storage unit 45, various types of data, such as image data obtained by the scanner 30 or a print job transmitted from the PC 10, are stored. The storage unit 45 is, for example, an HDD or a flash memory, which maintains data stored therein even if power of the MFP 40 is turned off.

The operation panel 46 has a display on which various types of information, such as an operation status, are displayed. The operation panel 46 has a touch panel capable of detecting a position at which a user touches the touch panel and detecting whether a user touches the touch panel. In other words, the operation panel 46 has a function of accepting a user operation as well as displaying information.

The control unit 47 controls the printer 20, the scanner 30, the storage unit 45 and the operation panel 46. The control unit 47 is, for example, a microcomputer chip on which a CPU a RAM and a ROM are embedded.

As described in detail below, the image processing device 1 allows a user to designate image data, process the selected image data as thumbnail image data, and adds the thumbnail image data to substantial image data. That is, the image processing device 1 is able to create image data with a thumbnail.

Figure 4:
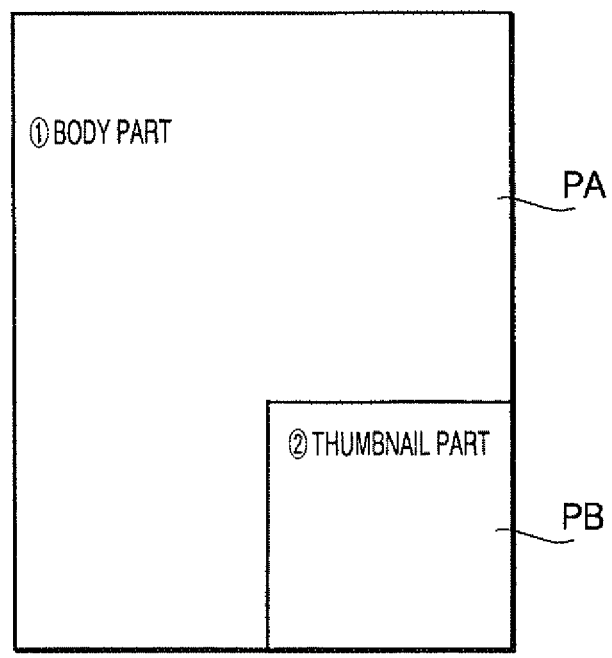
FIG. 4 illustrates a conceptual diagram of substantial image data with a thumbnail.

FIG. 4 illustrates a conceptual diagram of substantial image data with a thumbnail. As shown in FIG. 4, the image data with a thumbnail has a body part PA in which substantial image data to be displayed or printed is stored, and a thumbnail part PB in which a thumbnail image for identifying the substantial image data in the body part PA is stored. For example, a PDF (Portable Document Format) file or an XPS (XML Paper Specification) format file can be employed as a format of the image data with a thumbnail.

Figure 2:
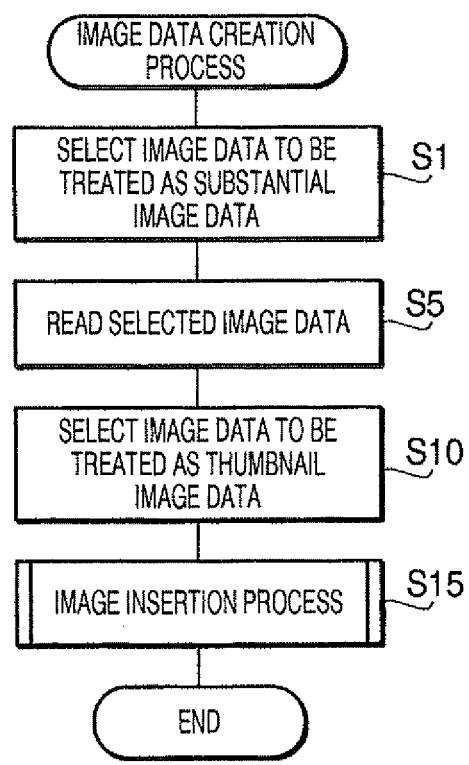
FIG. 2 is a flowchart illustrating an image data creation process for creating image data with a thumbnail in accordance with the first embodiment.

FIG. 2 is a flowchart illustrating an image data creation process for creating image data with a thumbnail. The image data creation process is executed under control of the control unit 47 of the MFP 40. Through the image data creation process, a user is able to designate thumbnail image data or select thumbnail image data from among a plurality of pieces of image data stored in the storage unit 45. The user is also allowed to select image data to be stored in the body part PA in association with the selected thumbnail image data.

The image data creation process is started when a menu item "create image data with a thumbnail" displayed on the operation panel 46 is selected by the user. First, the control unit 47 displays, on the display of the operation panel 46, a message for requesting a user to select or designate image data to be treated as substantial image data (step S1). In the following, it is assumed that the user selects image data (an image of a telephone) shown in FIG. 5A as substantial image data.

In step S5, the control unit 47 reads the selected image data, for example, from the storage unit 45. Then, the control unit 47 displays a message for requesting the user to select or designate image data to be treated as thumbnail image data (step S10). That is, in step S10, the user is allowed to designate a thumbnail image matching the selected substantial image. In the following, it is assumed that an image representing letters "Telephone" shown in FIG. 5B is selected by the user as a thumbnail image.

In step S15, an image insertion process is executed. In the image insertion process, the thumbnail image data selected in step S10 is inserted into the thumbnail part PB of the image data having the body part PA in which the image data obtained in step S5 is stored. Thus, the image insertion process terminates.

Figure 3:
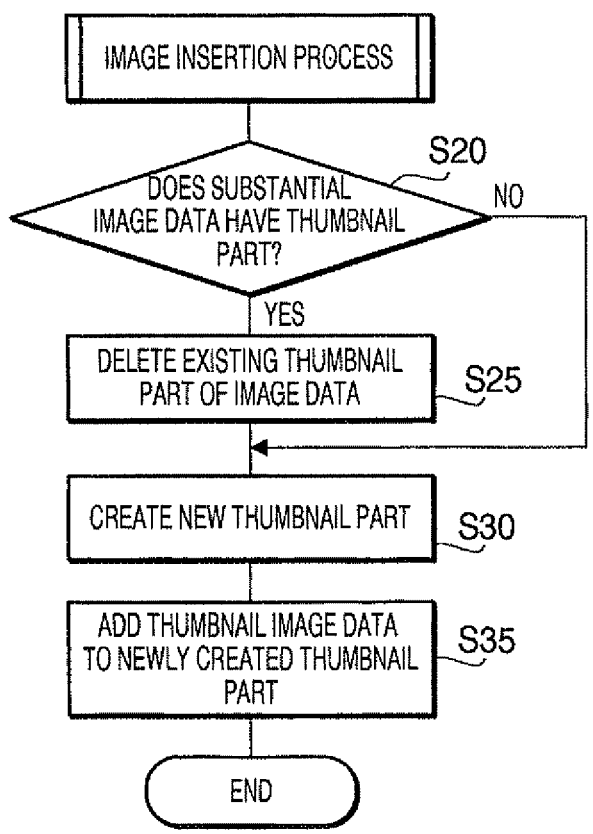
FIG. 3 is a flowchart illustrating an image insertion process executed by an MFP in accordance with the first embodiment.

FIG. 3 is a flowchart illustrating the image insertion process executed under control of the control unit 47 of the MFP 40. When the image insertion process is stared, the control unit 47 judges whether the image data read as substantial image data has the thumbnail part PB (step S20). That is, in step S20, the control unit 47 searches the image data read as substantial image data for a tag representing the thumbnail part PB. If a tag representing the thumbnail part PB is found, the control unit 47 judges that the image data read as substantial image data has the thumbnail part PB.

If the control unit 47 judges that the image data read as substantial image data has the thumbnail part PB (S20: YES), the control unit 47 deletes the thumbnail part PB of the image data (step S25). That is, the control unit 47 deletes the existing thumbnail part PB from the image data read as substantial image data in step S25. Then, the control unit 47 creates a new thumbnail part PB in the image data (step S30). The control unit 47 adds the thumbnail image data selected in step S10 to the newly created thumbnail part PB (step S35).

That is, if the control unit 47 judges that the thumbnail part PB is found (S20: YES), the control unit 47 deletes the existing tag representing the thumbnail part PB, adds a new tag representing the thumbnail part PB, and then adds the thumbnail image data selected in step S10 to the newly created thumbnail part PB.

On the other hand, if the control unit 47 judges that the existing thumbnail part PB is not found (S20: NO), the control unit 47 creates a new thumbnail part PB (step S30), and adds the thumbnail image data selected in step S10 to the newly created thumbnail part PB (step S35). Then, the image insertion process terminates.

That is, if the control unit 47 judges that the image data read as substantial image data does not have the existing thumbnail part PB (S20: NO), the control unit 47 adds a tag representing the thumbnail part PB to the image data, and adds the thumbnail image data selected in step S10 to the newly created thumbnail part PB.

As described above, according to the embodiment, thumbnail image data can be added to the substantial image data in accordance with a user operation. Such a configuration makes it possible to add a desired thumbnail image intended by a user to substantial image data. That is, thumbnail image data enabling the user to easily recognize the substantial image data can be added to the substantial image data. It is possible to create a thumbnail image reflecting properly a user' intention.

Therefore, according to the embodiment, the user is able to easily select or search for desired substantial image data while checking thumbnail images displayed on the operation panel 46 or printed on a recording medium.

Figure 5A:
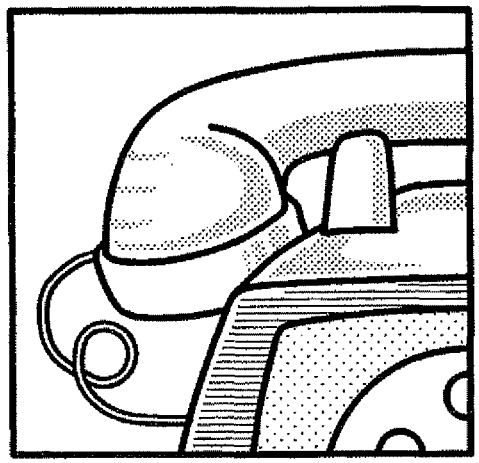
FIG. 5A illustrates an example of substantial image data.
Figure 5B:
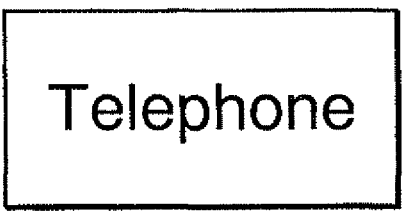
FIG. 5B illustrates an example of thumbnail image data.
Figure 5C:
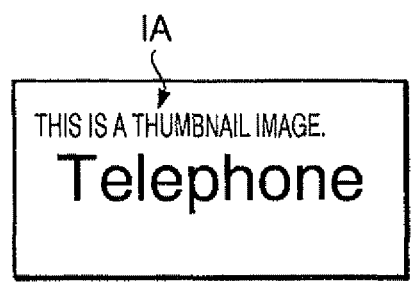
FIG. 5C illustrates an example of thumbnail image data to which identification information is added.

If a thumbnail image is an image corresponding to letters (e.g., an image corresponding to letters "Telephone" shown in FIG. 5B) specifying substantial image data (e.g., an image of a telephone shown in FIG. 5A), identification information (e.g., textual information) for discriminating a thumbnail image from a substantial image may be automatically added to the thumbnail image as illustrated in FIG. 5C. That is, if a thumbnail image is not image data obtained directly from original image data (substantial image data), such textual information for discriminating a thumbnail image from a substantial image may be added to the thumbnail image. In FIG. 5C, textual information IA ("This is an identifying image") is added to the thumbnail image.

Such a configuration enables the user to easily understand that a thumbnail image is created independently of substantial image data.

Second Embodiment

Hereafter, a second embodiment is described. Since a hardware configuration of an image processing device according to the second embodiment is substantially the same as that of the first embodiment, the block diagram of FIG. 1 is also referred to for explanations of the second embodiment. In the following, only the feature of the second embodiment is described for the sake of simplicity.

In the first embodiment, the image processing device 1 treats substantial image data and thumbnail image data, both of which are stored in a storage device (e.g., the storage unit 45 of the image processing device 1 or in the HDD 15 of the PC 10) which the image processing device 1 is able to access. By contrast, in the second embodiment, the image processing device 1 treats substantial image data obtained by the scanner 30 and thumbnail image data stored in the storage unit 45.

Figure 6:
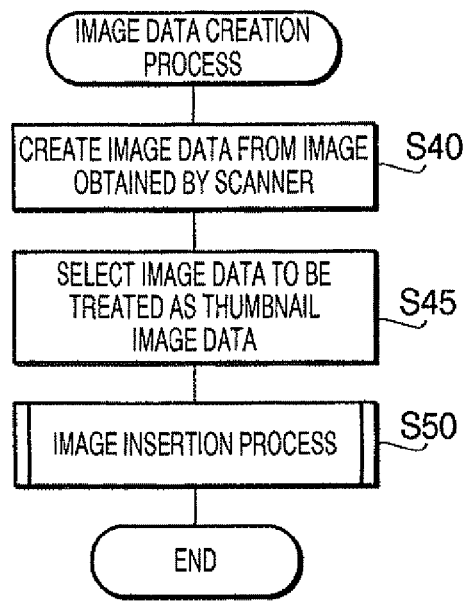
FIG. 6 is a flowchart illustrating an image data creation process for creating image data with a thumbnail in accordance with a second embodiment.

FIG. 6 is a flowchart illustrating an image data creation process for creating image data with a thumbnail according to the second embodiment. The image data creation process is executed under control of the control unit 47 of the MFP 40. The image data creation process is started when an image read start button provided on the operation panel 46 is operated by the user.

When the image data creation process is started, image data (substantial image data) is created from an image obtained by the scanner 30 (step S40). Then, the control unit 47 displays, on the display of the operation panel 47, a message requesting the user to select or designate image data to be treated as thumbnail image data. If image data to be treated as thumbnail image data is selected by the user, the control unit 47 defines the selected image data as thumbnail image data to be processed (step S45).

Next, the image insertion process shown in FIG. 3 is executed to insert the selected thumbnail image to the thumbnail part PB of the substantial image data (step S50). Then, the image data creation process terminates.

Third Embodiment

Hereafter, a third embodiment is described. Since a hardware configuration of an image processing device according to the third embodiment is substantially the same as that of the first embodiment, the block diagram of FIG. 1 is also referred to for explanations of the third embodiment. In the following, only the feature of the third embodiment is described for the sake of simplicity.

In the first embodiment, the image processing device 1 inserts thumbnail image data, which is stored in a storage device (e.g., the storage unit 45 of the image processing device 1 or in the HDD 15 of the PC 10) which the image processing device 1 is able to access, into the thumbnail part PB of the substantial image data. By contrast, according to the third embodiment, the size of image data selected as thumbnail image data by the user is reduced to a certain size suitable for a thumbnail image. The size of the image data can be reduced, for example, by decreasing the resolution of the image data.

The suitable size of thumbnail image data may be determined depending on the resolution of the display of the operation panel 46 or the printing resolution of the printer 20. Therefore, the suitable size of thumbnail image data varies depending on the model of the image MFP 40. For example, the suitable size of thumbnail image data corresponds to the resolution of 181×256.

Figure 7:
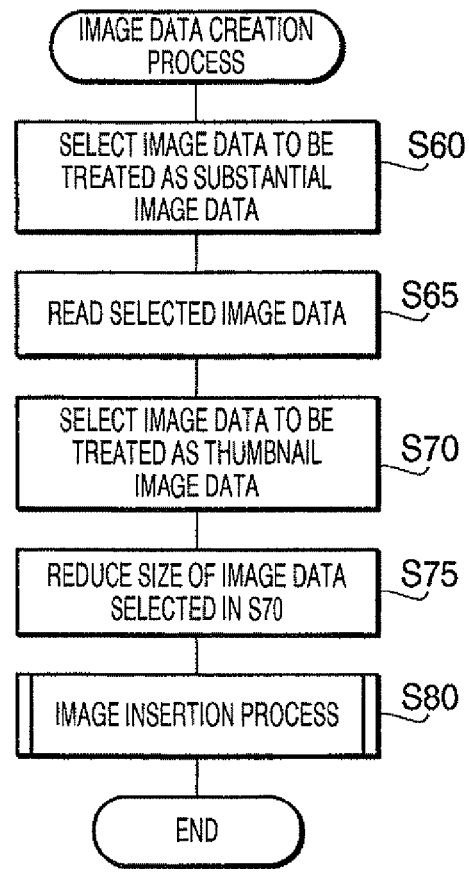
FIG. 7 is a flowchart illustrating an image data creation process for creating image data with a thumbnail in accordance with a third embodiment.

FIG. 7 is a flowchart illustrating an image data creation process for creating image data with a thumbnail according to the third embodiment. The image data creation process is executed under control of the control unit 47 of the MFP 40. In this embodiment, both of image data to be treated as substantial image data and image data to be treated as thumbnail image data are stored in a storage device (e.g., the storage unit 45 of the image processing device 1 or in the HDD 15 of the PC 10) which the image processing device 1 is able to access.

The image data creation process is started when a menu item "create image data with a thumbnail" displayed on the operation panel 46 is selected by the user. First, the control unit 47 displays, on the display of the operation panel 46, a message for requesting the user to select or designate image data to be treated as substantial image data. In this stage, the user is allowed to select or designate image data to be treated as substantial image data (step S60).

In step S65, the control unit 47 reads the selected image data, for example, from the storage unit 45. Then, the control unit 47 displays, on the display of the operation panel 46, a message for requesting the user to select or designate image data to be treated as thumbnail image data. The control unit 47 defines image data selected by the user as thumbnail image data (step S70).

Next, the control unit 47 reduces the size of the image data selected in step S70. Then, the image insertion process shown in FIG. 3 is executed to insert the thumbnail image data (the reduced image data) into the thumbnail part PB of the substantial image data (step S75). Then, the image data creation process terminates.

According to the third embodiment, it is possible to output an image corresponding to thumbnail image data in a relatively short time. It should be understood that the image data creation process shown in FIG. 7 can also be applied to the case where the image data to be treated as substantial image data is obtained through the image reading function of the scanner 30.

Fourth Embodiment

Hereafter, a fourth embodiment is described. Since a hardware configuration of an image processing device according to the fourth embodiment is substantially the same as that of the first embodiment, the block diagram of FIG. 1 is also referred to for explanations of the fourth embodiment. In the following, only the feature of the fourth embodiment is described for the sake of simplicity.

In the above described embodiments, image data to be treated as thumbnail image data is stored in a storage device (e.g., the storage unit 45 of the image processing device 1 or the HDD 15 of the PC 10) which the image processing device 1 is able to access. It should be noted that there maybe a case where the image data selected as thumbnail image data by the user does not have the suitable size as a thumbnail image.

For this reason, in this embodiment, the image processing device 1 is provided with a registering function for changing the size of image data selected by the user as thumbnail image data to the suitable size as a thumbnail image and registering the thumbnail image data in a storage device (e.g., the storage unit 45 of the image processing device 1 or the HDD 15 of the PC 10) which the image processing device 1 is able to access. In the following, it is assumed that image data obtained by the scanner 30 is registered as thumbnail image data.

Figure 8:
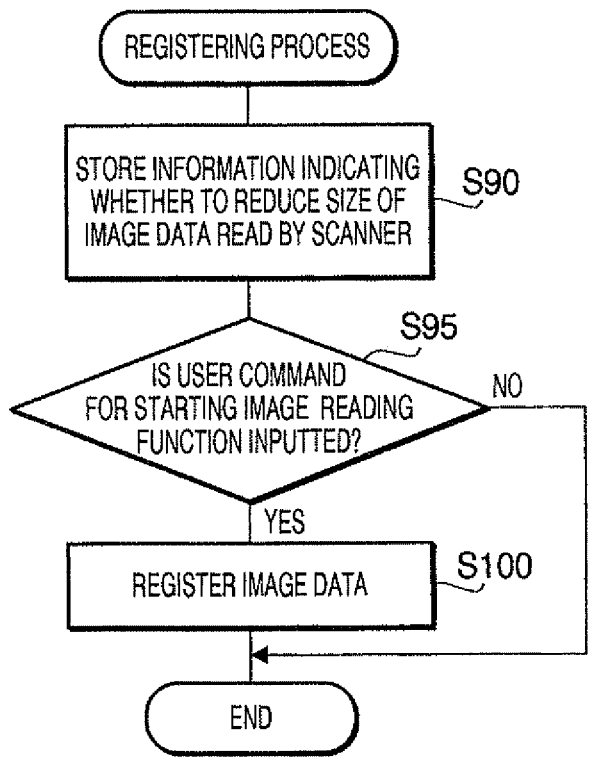
FIG. 8 is a flowchart illustrating a registering process for registering thumbnail image data in the image processing device in accordance with a fourth embodiment.

FIG. 8 is a flowchart illustrating a registering process for registering thumbnail image data in the image processing device 1. The registration process is executed under control of the control unit 47 of the MFP 40. FIGS. 9A to 9G illustrate examples of onscreen representation of the operation panel 46 during the registration process. FIGS. 9A to 9G show transitions of the onscreen representation on the operation panel 46 in time series.

The registering process is started when the user selects a menu item "YES" on the screen shown in FIG. 9A. That is, the registering process is started when the user instructs the MFP 40 to register image data read by the scanner 30 as thumbnail image data.

When the registering process is started, the control unit 47 determines whether to form thumbnail image data by reducing the size of image data read by the scanner 30, in accordance with a user command inputted, for example, through the screen shown in FIG. 9B. Then, the control unit 47 stores information indicating whether to reduce the size of image data read by the scanner 30, in the storage unit 45 (step S90).

Then, the control unit 47 judges whether the user selected a menu item for instructing the MFP 40 to start the image reading function through a screen shown in FIG. 9C (step S95). If a user command for starting the image reading function is inputted (S95: YES), the image reading function is executed. In this stage, a message "scanning . . . " is displayed on the display of the operation panel 46 as illustrated in FIG. 9D.

Then, the image data obtained by the scanner 30 is registered in the storage unit 45 as image data to be used exclusively as thumbnail image data (step S100). In this stage, the screen shown in FIG. 9E is displayed on the operation panel 46. If the thumbnail image shown in FIG. 5B is registered through the registering process, the image data is registered in a registration name of "telephone" as illustrated in FIG. 9F. After step S100 is processed, the screen shown in FIG. 9G is displayed on the operation panel 46. Then, the registering process terminates.

In the registering process, when the menu item "YES" is selected through the screen shown in FIG. 9B, the image data of which size is reduced to the size smaller than or equal to a certain size is registered in the storage unit 45. On the other hand, when the menu item "NO" is selected through the screen shown in FIG. 9B, the image data obtained by the scanner 30 is registered as thumbnail image data without being subjected to the reducing process.

As described above, according to the embodiment, the user is allowed to register desired thumbnail images in the image processing device 1. Since reduced image data is registered as thumbnail image data, it is possible to prevent image data having a relatively large size from being stored in the image processing device 1 as thumbnail image data.

Fifth Embodiment

Hereafter, a fifth embodiment is described. Since a hardware configuration of an image processing device according to the fifth embodiment is substantially the same as that of the first embodiment, the block diagram of FIG. 1 is also referred to for explanations of the fifth embodiment. In the following, only the feature of the fifth embodiment is described.

In the fourth embodiment, image data obtained by the scanner 30 is registered as thumbnail image data. By contrast, in the fifth embodiment, image data stored in a storage device (e.g., the HDD 15 of the PC 10) is registered as thumbnail image data.

Figure 10:
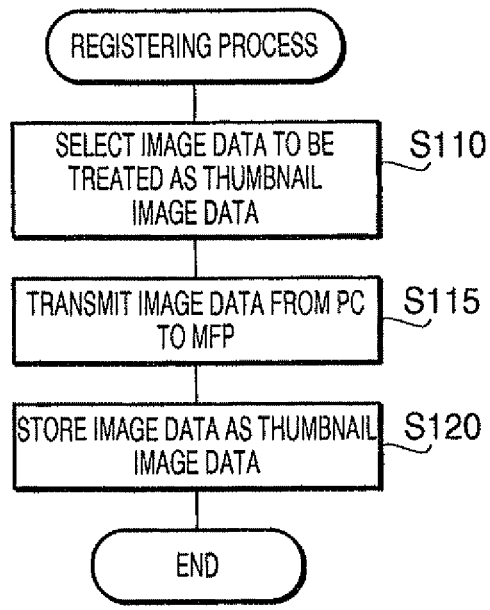
FIG. 10 is a flowchart illustrating a registering process for registering thumbnail image data in accordance with a fifth embodiment.

FIG. 10 is a flowchart illustrating a registering process for registering thumbnail image data. The registering process is executed under control of the control unit 47 of the MFP 40. The registering process is started when the user selects a registration button provided on the operation panel 46 to start registering a thumbnail image.

When the registering process is started, the control unit 47 displays, on the display of the operation panel 47, a message requesting the user to select or designate image data to be treated as thumbnail image data. In this stage, the user is able to designate image data or select image data from among a plurality of pieces of image data stored, for example, in the HDD 15 of the PC 10 (step S110). Next, in step S115, the image data selected in step S110 is transmitted from the HDD 15 of the PC 10 to the storage unit 45 of the MFP 40 (step S115).

Then, the image data transmitted from the PC 10 is stored in the storage unit 42 as thumbnail image data (step S120). When the image data is stored in the storage unit 45 in step S120, the size of the image data is automatically reduced to a size lower than or equal to a predetermined size. After step S120 is processed, the registering process terminates.

Although in step S120 the size of the image data is automatically reduced, the control unit 47 may request the user to select whether to reduce the size of the image data as in the case of the registering process (step S90) of the fourth embodiment. In this case, the control unit 47 may decide whether to reduce the image data in accordance with a user instruction.

Sixth Embodiment

Hereafter, a sixth embodiment is described. Since a hardware configuration of an image processing device according to the sixth embodiment is substantially the same as that of the first embodiment, the block diagram of FIG. 1 is also referred to for explanations of the sixth embodiment. In the following, only the feature of the sixth embodiment is described for the sake of simplicity.

In the first embodiment, image data stored in the storage unit 45 or the HDD 15 is added to the substantial image data. By contrast, in this embodiment, dedicated thumbnail image data stored through the registering process according to the fourth or fifth embodiment is added to the substantial image data to form image data with a thumbnail.

Figure 11:
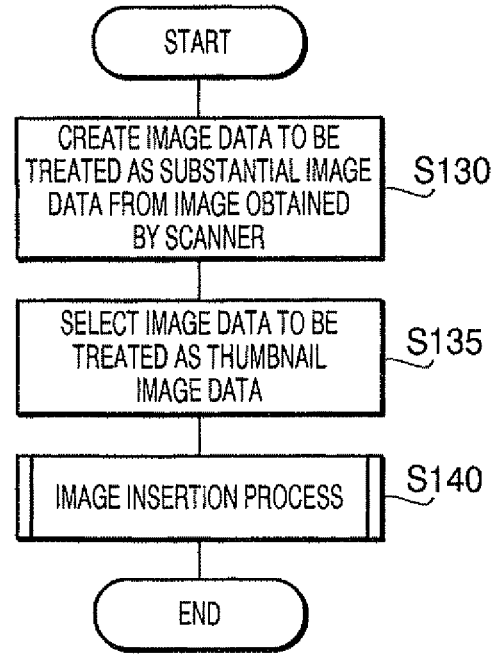
FIG. 11 is a flowchart illustrating an image data creation process for creating image data with a thumbnail in accordance with a sixth embodiment.

FIG. 11 is a flowchart illustrating an image data creation process for creating image data with a thumbnail according to the sixth embodiment. The image data creation process is executed under control of the control unit 47 of the MFP 40. FIGS. 12A to 12E illustrate examples of onscreen representation of the operation panel 46 during the image data creation process. FIGS. 12A to 12E show transitions of the onscreen representation on the operation panel 46 in time series.

In the following, it is assumed that image data obtained by the scanner 30 is treated as substantial image data. When an image read start button (i.e., a menu item "YES" on the screen shown FIG. 12A) on the operation panel 46 is operated, the image creation process is started, the control unit 47 controls the scanner 30 to start the reading operation, and the control unit 47 creates image data to be treated as substantial image data (step S130). In this stage, a screen shown in FIG. 12B is displayed on the operation panel 46.

Next, in step S135, the control unit 47 displays, on the display of the operation panel 46, a message screen for requesting the user to select image data to be treated as thumbnail image data from among a plurality of pieces of dedicated thumbnail image data registered in the storage unit 45 (see FIG. 12C). The control unit 47 defines the selected image data as thumbnail image data to be processed (step S135).

In the following, it is assumed that the image data shown in FIG. 5A is obtained by the scanner 30, and the image data shown in FIG. 5B is selected by the user as thumbnail image data to be processed.

After step S135 is processed, the image insertion process shown in FIG. 3 is executed (step S140). More specifically, the image data selected in step S135 is inserted into the thumbnail part PB associated with the substantial image data obtained by the scanner 30. Thus, image data with a thumbnail is created. After step S140 is processed, the image data creation process terminates.

Seventh Embodiment

Hereafter, a seventh embodiment is described. Since a hardware configuration of an image processing device according to the seventh embodiment is substantially the same as that of the first embodiment the block diagram of FIG. 1 is also referred to for explanations of the seventh embodiment. In the following, only the feature of the seventh embodiment is described.

In this embodiment, image data obtained by the scanner 30 is directly inserted into the body part B of substantial image data. That is, in this embodiment, execution of the registering process shown in FIG. 8 or FIG. 10 is not required.

Figure 13:
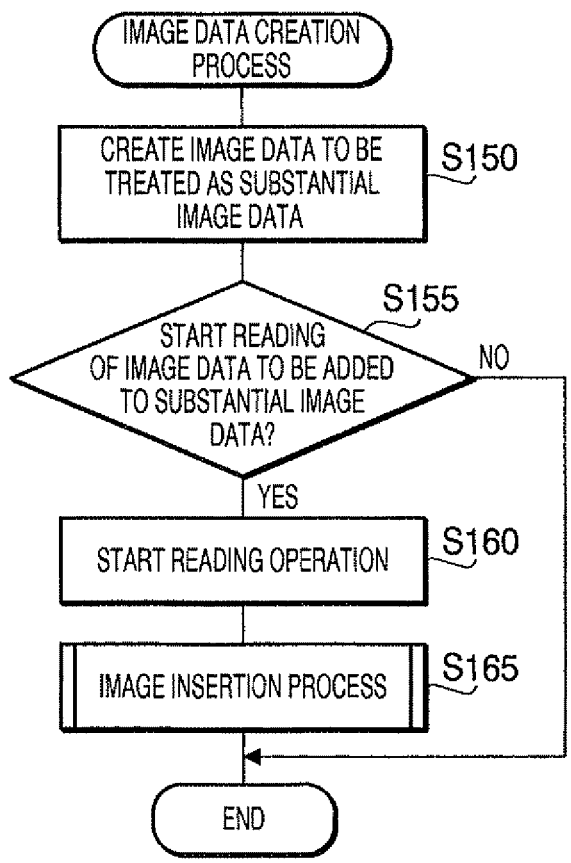
FIG. 13 is a flowchart illustrating an image data creation process for creating image data with a thumbnail in accordance with a seventh embodiment.

FIG. 13 is a flowchart illustrating an image data creation process for creating image data with a thumbnail according to the seventh embodiment. The image data creation process is executed under control of the control unit 47 of the MFP 40. FIGS. 14A to 14F illustrate examples of onscreen representation of the operation panel 46 during the image data creation process. FIGS. 14A to 14F show transitions of the onscreen representation on the operation panel 46 in time series.

When an image read start button (i.e., a menu item "YES" on the screen shown FIG. 14A) on the operation panel 46 is operated, the image creation process is started, the control unit 47 controls the scanner 30 to start the reading operation, and the control unit 47 creates image data to be treated as substantial image data (step S150). In this stage, a screen shown in FIG. 14B is displayed on the operation panel 46.

After the substantial image data is created, the control unit 47 displays a message screen for inquiring of the user whether to start reading of image data to be added to substantial image data (step S155). In step S155, the user is allowed to select whether to start reading of image data to be treated as thumbnail image data through a screen shown in FIG. 14C.

If a user command for instructing the MFP 40 not to start the reading operation is not inputted (S155: NO), the control unit 47 displays a message shown in FIG. 14F. Then, the image data creation process terminates.

If the user command for instructing the MFP 40 to start the reading operation is inputted (S155: YES), the control unit 47 starts the reading operation while displaying a message shown in FIG. 14D (step S160). In this case, the image shown in FIG. 5A is read by the scanner 30.

In this embodiment, when a menu item "YES" is selected through the screen shown in FIG. 14A, the image shown in FIG. 5A is read by the scanner 30. When a menu item "YES" is selected by the user through the screen shown in FIG. 14C, the image shown in FIG. 5B is obtained by the scanner 30.

After step S160 is processed, the image insertion process shown in FIG. 3 is executed in step S165. More specifically, the control unit 47 inserts the image data obtained through the image reading function of the scanner 30 in step S160 into the thumbnail part B associated with the substantial image data, while displaying a message shown in FIG. 14E. Thus, image data with a thumbnail is created. In this embodiment, the control unit 47 reduces the size of the image data obtained in step S160 to have a size smaller than or equal to a predetermined size.

Although in this embodiment the reduced image data is inserted into the body part PB, the control unit 47 may inquire of the user whether to reduce the image data obtained in step S160 before inserting the image data into the thumbnail part PB. In this case, the control unit 47 decides whether to reduce the image data obtained in step S160, in accordance with a user command.

Eighth Embodiment

Hereafter, an eighth embodiment is described. Since a hardware configuration of an image processing device according to the eighth embodiment is substantially the same as that of the first embodiment, the block diagram of FIG. 1 is also referred to for explanations of the eighth embodiment. In the following, only the feature of the eighth embodiment is described for the sake of simplicity.

In this embodiment, the reading operation is executed automatically through the scanner 30 in a predetermined reading mode suitable for a thumbnail image. The predetermined reading mode suitable for a thumbnail image corresponds to the reading operation in a certain resolution suitable for a thumbnail image. The certain resolution suitable for a thumbnail image is determined, for example, in accordance with the resolution of the display of the operation panel 46 or the printing resolution of the printer 20. For example, a reading resolution of 10 to 100 dpi is suitable for a thumbnail image.

For this reason, in this embodiment, image data to be treated as a thumbnail image is read through the scanner 30 in a relatively low reading resolution of approximately 50 dpi. On the other hand, image data to be treated as a substantial image is read through the scanner 30 in a relatively high resolution of 300 to 600 dpi.

Figure 15:
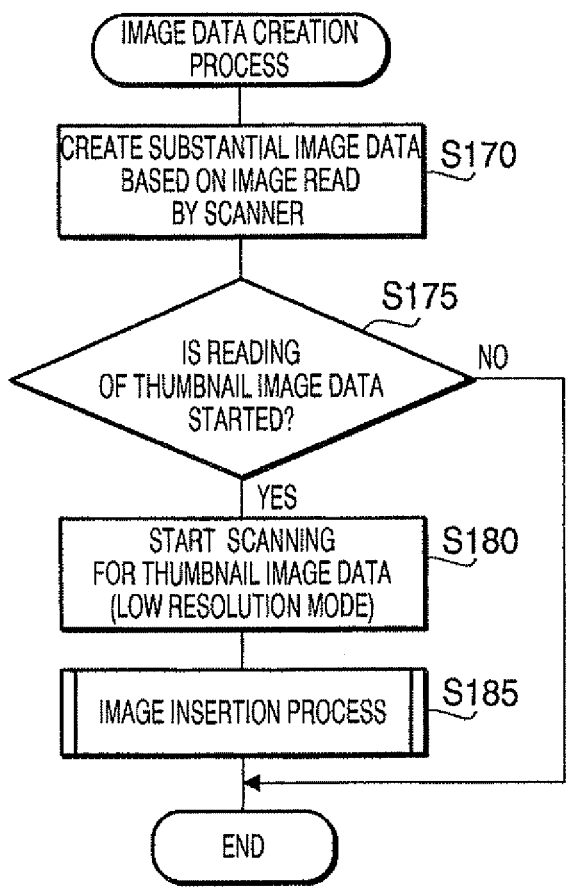
FIG. 15 is a flowchart illustrating an image data creation process for creating image data with a thumbnail in accordance with an eighth embodiment.

FIG. 15 is a flowchart illustrating an image data creation process for creating image data with a thumbnail according to the eighth embodiment. The image data creation process is executed under control of the control unit 47 of the MFP 40. In this embodiment, image data obtained through the scanner 30 is treated as substantial image data.

When an image read start button provided, for example, on the operation panel 46 is operated, the image data creation process is started, and substantial image data is created based on an image read by the scanner 30 (step S170).

After the substantial image data is created, the control unit 47 displays a message screen for inquiring of the user whether to start reading of image data to be added to substantial image data (step S175). In step S175, the user is allowed to select whether to start reading of image data to be treated as thumbnail image data. If the user command for instructing the control unit 47 not to start the reading operation is inputted (S175: NO), the image data creation process terminates.

If the user command for instructing the control unit 47 to start the reading operation is inputted (S175: YES), the control unit 47 executes the reading operation in the predetermined reading mode (i.e., a low resolution reading mode) suitable for a thumbnail image (step S180). After step S180 is processed, the image insertion process shown in FIG. 3 is executed. In step S185, the control unit 47 inserts the image data read by the scanner 30 into the thumbnail part PB associated with the substantial image data. Thus, image data with a thumbnail is created.

According to the eighth embodiment, the thumbnail image data is obtained by executing the reading operation in a low resolution mode. Therefore, the user is not required to operate the MFP 40 to reduce the image data to create thumbnail image data.

Ninth Embodiment

Hereafter, a ninth embodiment is described. Since a hardware configuration of an image processing device according to the ninth embodiment is substantially the same as that of the first embodiment, the block diagram of FIG. 1 is also referred to for explanations of the ninth embodiment. In the following, only the feature of the ninth embodiment is described for the sake of simplicity.

Figure 16:
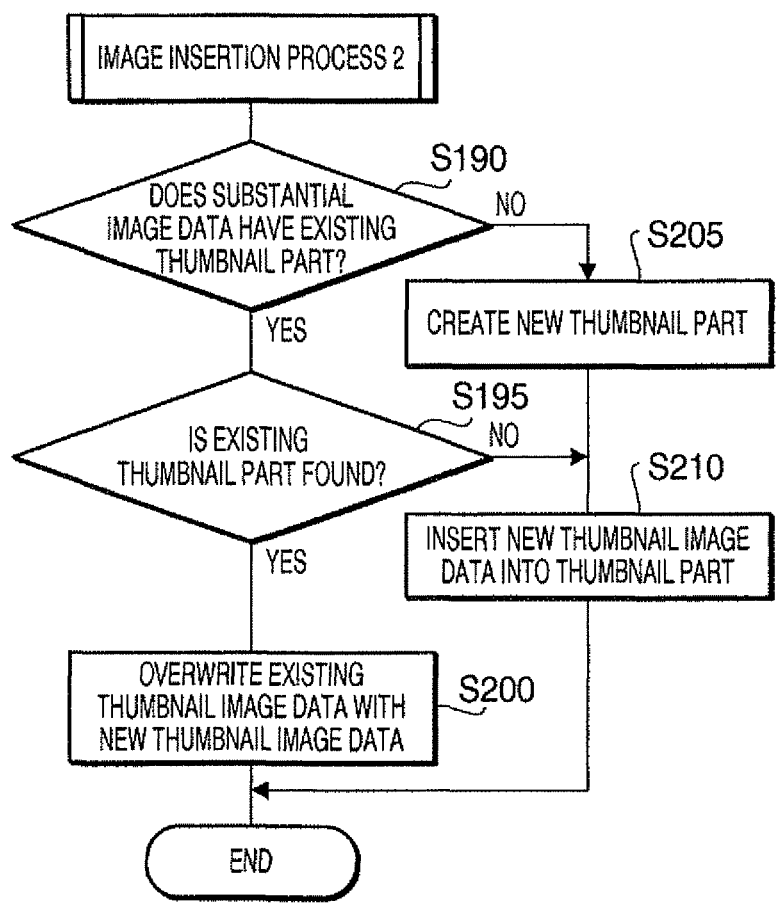
FIG. 16 is a flowchart illustrating an image insertion process in accordance with a ninth embodiment.

FIG. 16 is a flowchart illustrating an image insertion process 2 according to a ninth embodiment. The image insertion process 2 can be executed in place of the image insertion process shown in FIG. 3. In the above described embodiment, the control unit 47 checks whether the existing thumbnail part PB is found in substantial image data. If the existing thumbnail part PB is found in the substantial image data, the control unit 47 deletes the existing thumbnail part PB from the substantial image data, and then creates a new thumbnail part PB in the substantial image data. By contrast, according to the ninth embodiment, the control unit 47 checks whether substantial image data has an existing thumbnail part PB (step S190). If the existing thumbnail part B is found (S190: YES), the control unit 47 checks whether the existing thumbnail part PB has thumbnail image data (step S195).

That is, the control unit 47 checks whether the substantial image data has thumbnail image data by searching the substantial image data for a tag indicating the thumbnail part PB. If the control unit 47 detects the tag indicating the thumbnail part PB, the control unit 47 further checks whether thumbnail image data has been already inserted into the thumbnail part PB indicated by the detected tag.

If the control unit 47 judges that thumbnail image data has already been inserted into the thumbnail part PB (i.e., the thumbnail part PB has an existing thumbnail image data) (S195: YES), the control unit 47 overwrites the existing thumbnail image data with new thumbnail image data (step S200). Then, the image insertion process 2 terminates.

That is, if the control unit 47 judges that the thumbnail image data has been already inserted into the thumbnail part PB indicated by the tag, the control unit 47 deletes the existing thumbnail image data inserted into the thumbnail part PB indicated by the tag, and then inserts new thumbnail image data into the thumbnail part PB.

If the control unit 47 judges that the thumbnail image data has not been inserted into the thumbnail part PB indicated by the tag (S195: NO), the control unit 47 inserts new thumbnail image data into the thumbnail part PB (step S210). Then, the image insertion process 2 terminates.

That is, if the control unit 47 judges that the existing thumbnail image is not inserted into the thumbnail part B indicated by the tag, the control unit 47 inserts new thumbnail image data into the thumbnail part PB.

If the control unit 47 judges that the substantial image data does not have the thumbnail part PB (S190: NO), the control unit 47 creates a new thumbnail part PB (step S205), and then inserts thumbnail image data into the newly created thumbnail part PB (step S210). Then, the image insertion process 2 terminates.

More specifically, if the control unit 47 judges that the substantial image data does not have the thumbnail part PB, the control unit 47 adds a tag indicating the thumbnail part PB to the substantial image data, and inserts new thumbnail image data into the thumbnail part PB indicated by the tag.

Although the present invention has been described in considerable detail with reference to certain preferred embodiments thereof, other embodiments are possible.

In the above described embodiments, the creation of image data with a thumbnail is executed under control of the control unit 47 of the MFP 40. However, the creation of image data with a thumbnail may be executed under control of the CPU 12 of the PC 10.

In the above described embodiments, various processes including the image data creation process, the registering process and the image insertion process are executed on the image processing device 1 formed of the PC 10 and the MFP 40. However, the various processes may be implemented on a single device, such as, a PC (PC 10), an MFP (MFP 40) or a digital camera. That is, the various processes according to the embodiments may be implemented on a single device.

In the above described embodiments, image data having a thumbnail is displayed on the operation panel 46 or is printed by the printer 20. However, the image data with a thumbnail may be displayed on the LCD 11 of the PC 10.

In the above described embodiments, if a thumbnail image is not image data obtained directly from substantial image data, identification information for discriminating a thumbnail image from a substantial image is added to the thumbnail image (see FIG. 5C). It is understood that variations of such a feature can be achieved.

For example, if a thumbnail image has a predetermined property (e.g., a low contrast), the control unit 47 may add the identification information (e.g., textual information "This is a thumbnail image") to the thumbnail image. The MFP 40 may display a screen for allowing a user to select whether to add the identification information to thumbnail image data. In this case, the MFP 40 adds the identification information into a thumbnail image in accordance with a user instruction.

In the above described embodiment, the user is allowed to separately designate image data to be treated as a thumbnail image and image data to be treated as a substantial image. However, the MFP 40 may be configured to allow a user to designate a part or entire of a substantial image as a thumbnail image. In this case, the MFP 40 displays a screen for allowing a user to specify a region in a substantial image to be treated as a thumbnail image. As a result the thumbnail image (i.e., a copy of the part or the entire of the substantial image) is inserted into the thumbnail part PB associated with the substantial image. For example, if a substantial image is a telephone, a part of the image of the telephone (e.g., an image of a ten key) can be specified as a thumbnail image.

What is claimed is:

1. An image processing device, comprising:
    an input unit configured to accept a user instruction to designate first image data; and
    an image addition unit configured to add the first image data corresponding to the user instruction to second image data, as a thumbnail for the second image data, the image addition unit processes the first image data such that identification information is included for discriminating the first image data from image data created by reducing a size of the second image data,
    wherein the first image data is not image data generated from the second image data.

2. The image processing device according to claim 1, further comprising a first reduction unit configured to reduce a size of the first image data, wherein the image addition unit adds the first image data of which size is reduced by the first reduction unit, to the second image data.

3. The image processing device according to claim 1, further comprising a storage unit configured to store a plurality of pieces of image data, wherein the input unit is configured to allow a user to select the first image data from among the plurality of pieces of image data stored in the storage unit.

4. The image processing device according to claim 3, further comprising a registering unit configured to register image data to be treated as the first image data, in the storage unit.

5. The image processing device according to claim 4, further comprising a second reduction unit configured to reduce a size of the first image data, wherein the registering unit stores the first image data of which size is reduced by the second reduction unit.

6. The image processing device according to claim 1, further comprising a reading unit configured to read an image from a document, wherein the input unit is configured to accept the user instruction for using image data obtained through the reading unit as the first image data to be added to the second image data as a thumbnail.

7. The image processing device according to claim 6, wherein:
    the reading unit has a first reading mode of reading a document in a first resolution and a second reading mode of reading a document in a second resolution lower than the first resolution; and
    the input unit accepts the user instruction for using image data obtained by the reading unit in the second reading mode, as the first image data to be added to the second image data as a thumbnail.

8. The image processing device according to claim 1, further comprising a deletion unit configured such that if a thumbnail has been already added to the second image data when the image addition unit adds the first image data to the second image data, the deletion unit deletes the thumbnail already added to the second image data.

9. The image processing device according to claim 1, wherein if a thumbnail has already been added to the second imaged data, the image addition unit overwrites the thumbnail with the first image data.

10. The image processing device according to claim 1, further comprising a display control unit configured to display an image corresponding to the first image data added as a thumbnail to the second image data.

11. The image processing device according to claim 1, further comprising a print unit configured to print an image corresponding to the first image data added as a thumbnail to the second image data.

12. An image processing method, comprising the steps of:
    accepting a user instruction to designate first image data; and
    adding the first image data corresponding to the user instruction to second image data, as a thumbnail for the second image data, the first image data being processed to include identification information for discriminating the first image data from image data created by reducing a size of the second image data,
    wherein the first image data is not image data generated from the second image data.

13. The image processing method according to claim 12, further comprising the step of reducing a size of the first image data, wherein, in the step of adding, the first image data of which size is reduced is added to the second image data.

14. The image processing method according to claim 12, further comprising the step of registering image data to be treated as the first image data, in a storage unit.

15. The image processing method according to claim 14, further comprising the step of reducing a size of the first image data so that the first image data of which size is reduced is registered by the step of registering.

16. A computer readable storage device having computer readable instruction stored thereon, which, when executed by a processor of an image processing device, configures the processor to perform the steps of:
    accepting a user instruction to designate first image data; and
    adding the first image data corresponding to the user instruction to second image data, as a thumbnail for the second image data, the first image data being processed to include identification information for discriminating the first image data from image data created by reducing a size of the second image data,
    wherein the first image data is not image data generated from the second image data.

17. The computer readable storage device according to claim 16, wherein the instruction further configures the processor to perform the step of reducing a size of the first image data,
    wherein, in the step of adding, the first image data of which size is reduced is added to the second image data.

18. The computer readable storage device according to claim 16, wherein the instruction further configures the processor to perform the step of registering image data to be treated as the first image data, in a storage unit.

19. The computer readable storage device according to claim 18, wherein the instruction further configures the processor to perform the step of reducing a size of the first image data so that the first image data of which size is reduced is registered by the step of registering.

* * * * *